J. RADDIN.
CAR-COUPLING.
No. 180,728.  Patented Aug. 8, 1876.
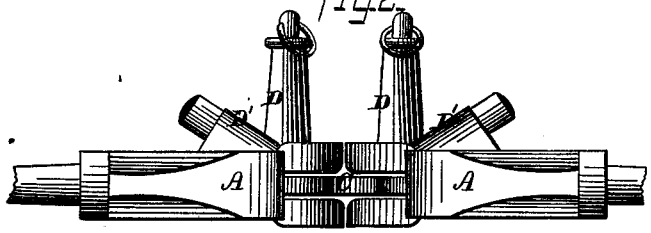
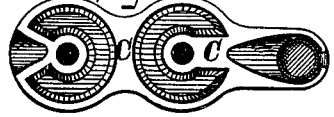
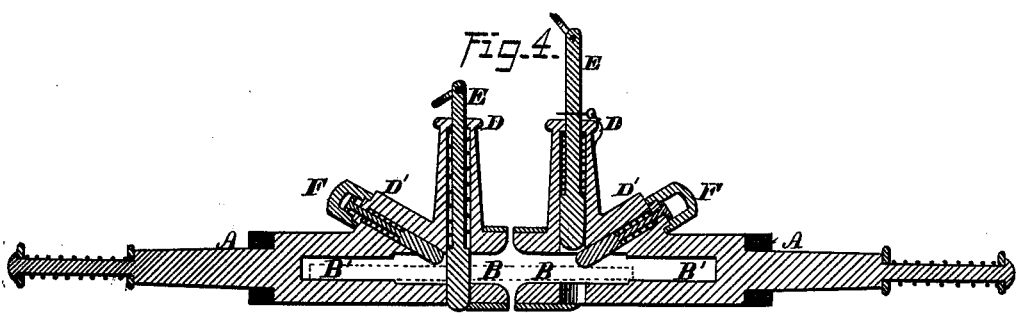
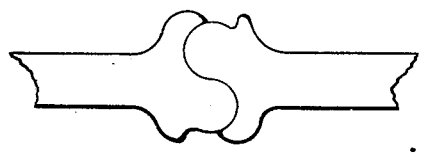
WITNESSES:
Jas. E. Hutchinson
John R. Young
INVENTOR.
John Raddin, by
Prindle & Co., his Attys

UNITED STATES PATENT OFFICE.

JOHN RADDIN, OF LYNN, MASSACHUSETTS.

IMPROVEMENT IN CAR-COUPLINGS.

Specification forming part of Letters Patent No. 180,728, dated August 8, 1876; application filed May 17, 1875.

*To all whom it may concern:*

Be it known that I, JOHN RADDIN, of Lynn, Essex county, State of Massachusetts, have invented certain new and useful Improvements in Car-Couplings; and do hereby declare that the following is a full, clear, and exact description thereof, reference being had to the accompanying drawings, making a part of this specification, in which—

Figure 1 represents a plan view of my improved car-coupling. Fig. 2 is a side elevation of the same with the end fastenings broken off. Fig. 3 is a plan view of the link. Fig. 4 is a longitudinal vertical section. Figs. 5 and 6 show a modification of the ends of the draw-bars, by means of which the chafing-surface may be largely increased, if desired to use as a buffer.

Letters of like name and kind refer to like parts in each of the figures.

The object of my invention is to produce a cheap and reliable self-acting car-coupling that will not necessitate any change of cars in order to apply it, and that will reduce the slack of trains to a minimum; and it consists, principally, in a draw-head for railroad-cars provided with an outer and an inner chamber, for the reception of a solid link, and constructed in the manner and for the purpose substantially as is hereinafter shown and described. It consists, further, in the peculiar manner of constructing said draw-head with reference to operating the link-pins, in the manner and for the purpose substantially as is hereinafter shown and described. It consists, finally, in a solid link of peculiar shape, one end of which is elongated to correspond with the inner chamber, in the manner and for the purpose substantially as is hereinafter shown and described.

In the annexed drawings, A and A represent the draw-heads, each provided with an outer and an inner chamber, B and B', for the reception of the link C, the latter conforming in general shape to the said chambers B and B'. The inner chamber or recess B' is intended to be only about one-half the width horizontally of the outer chamber B, and the rear or inner ends of both chambers are preferably made semicircular, so as to correspond in shape with the link C. One end of said link C is elongated, as shown in Fig. 3, and the elongated portion as well as that portion designed for draft is caused to nearly fill the outer and inner chambers B and B', except vertically. The object of the inner chamber, to which the elongated portion of the link is fitted, is to provide means whereby the link may be firmly held in a central position at the time of coupling two or more cars. The link C not being sufficiently thick to fill the chambers B and B' vertically, compensates for the difference in vibration of the cars upon their springs. Two spring-chambers, D and D', are cast solid upon the upper side of each draw-head A and A, and afford a means by which the link-pins and springs E and E and restraining-pins and springs F and F are secured in position and operated. The chamber D is placed vertical and central with the hole provided for the link-pin. The chamber D' is placed in the rear of chamber D, in the same plane, at an angle of thirty degrees, more or less, and inclines rearward and upward. A hole of suitable size, provided in the upper end of the chamber D, corresponding in position with similar holes that are provided in the upper and lower jaws of the draw-head A, and link C, to and through which the link-pin E is fitted, furnish the means by which the draw-heads are coupled. A coiled spring within the chamber D encircles the link-pin E, and, by pressing against the upper end of the chamber D, and against a shoulder upon the link-pin E, tends to force the latter into position. The restraining-pin F is arranged and actuated by a coiled spring in a manner similar to that of the link-pin E, except that it occupies a position diagonal to the said link-pin; is shorter, and performs a different office, as will be more fully explained hereafter. A ring-handle is provided upon the upper ends of the link-pins E and E, by means of which said pins are withdrawn when necessary to do so. The restraining-pins F and F, being in all respects self-acting, are covered and kept free from dirt by means of caps. The link C is preferably made solid and reversible, and the holes provided in it for the link-pin correspond in size and position to those in the draw-heads A and A, and each end is provided with a central wedge-shaped groove upon each side, extending from the end of said link to the link-pin holes, the office of which is to disengage the link-pin E at the proper time, and complete the act of coupling. The ends of the draw-heads A and A, by means of which said draw-heads are fastened and secured to the framing of the cars, may be constructed for rubber, coil, volute, or air springs or cushions, as may be preferred, as I am aware that all of these devices have long been used.

As thus constructed, the draw-heads and link, which form a complete self-coupling, are completed, and their operation is as follows: Each draw-head is fastened and secured to a car. The link C is placed in position, with the elongated end within the draw-head, and, of course, the link-pin E in its place, thus securing the link firmly within this draw-head. By means of the ring upon the upper end of link-pin E in the other draw-head, said link-pin is pulled upward as far as the shoulder within the chamber will permit it to go, at which point it is caught and held by the restraining-pin in the following manner, viz: The point of the restraining-pin F is caused to impinge upon the link-pin E constantly, in consequence of being forced downward by means of the coil-spring surrounding it, and when the link-pin is drawn upward sufficiently the point of the restraining-pin is projected partially under the point of the link-pin, and the latter is thus held in position. The signal being given, the two cars are shoved or run together, and as the short end of the link enters the draw-head within which the pin is raised, the wedge-shaped groove upon the link is brought in contact with the lower ends of the link-pin and restraining-pin, forcing each outward until the hole in the link is brought exactly beneath the point of the link-pin, at which instant the spring within the chamber forces said pin through the hole of the link and lower part of the draw-head into position, and thus the act of coupling two cars is completed.

It will be seen that the whole operation is accomplished without endangering life or limb, and as quickly and with as much certainty as it is possible to do it by the ordinary method of hand-coupling. Another great advantage of my improved self-coupling consists in doing away, in a great measure, with the swaying motion of the cars, which is most effectually accomplished by means of the elongated link and the inner chamber or recess.

Having thus fully set forth the nature and merits of my invention, what I claim as new is—

1. In combination with the draw-heads A and A, each provided with an outer and inner chamber, B and B', for the reception of the link C, the spring-chambers D and D', cast solid upon said draw-heads, the former occupying a vertical position, and the latter placed immediately in its rear, and inclining rearward and upward at an angle of about thirty degrees, in the manner and for the purpose substantially as shown and set forth.

2. The combination of the draw-heads A and A, the spring-chambers D and D', the link-pins E and E, and restraining-pins F and F, each of said pins being provided with a coil-spring and shoulder near its lower end, and constructed and arranged so that the point of the restraining-pin F is caused to impinge upon the link-pin E constantly, in the manner and for the purpose substantially as shown and described.

3. In combination with the link C, one end of which is elongated, and provided with wedge-shaped grooves upon each side at each end, the draw-heads A and A, provided with outer chambers B and B and inner chambers B' and B', that correspond in size and shape with said link C, constructed and arranged in the manner and for the purpose substantially as shown and described.

In testimony whereof I have hereunto set my hand this 8th day of May, 1875.

JOHN RADDIN.

Witnesses:
 THOS. WM. CLARKE,
 F. F. RAYMOND.